July 3, 1962 C. W. KRUCKEBERG 3,042,083
AUTOMATIC NOZZLE
Filed Oct. 30, 1959 2 Sheets-Sheet 1
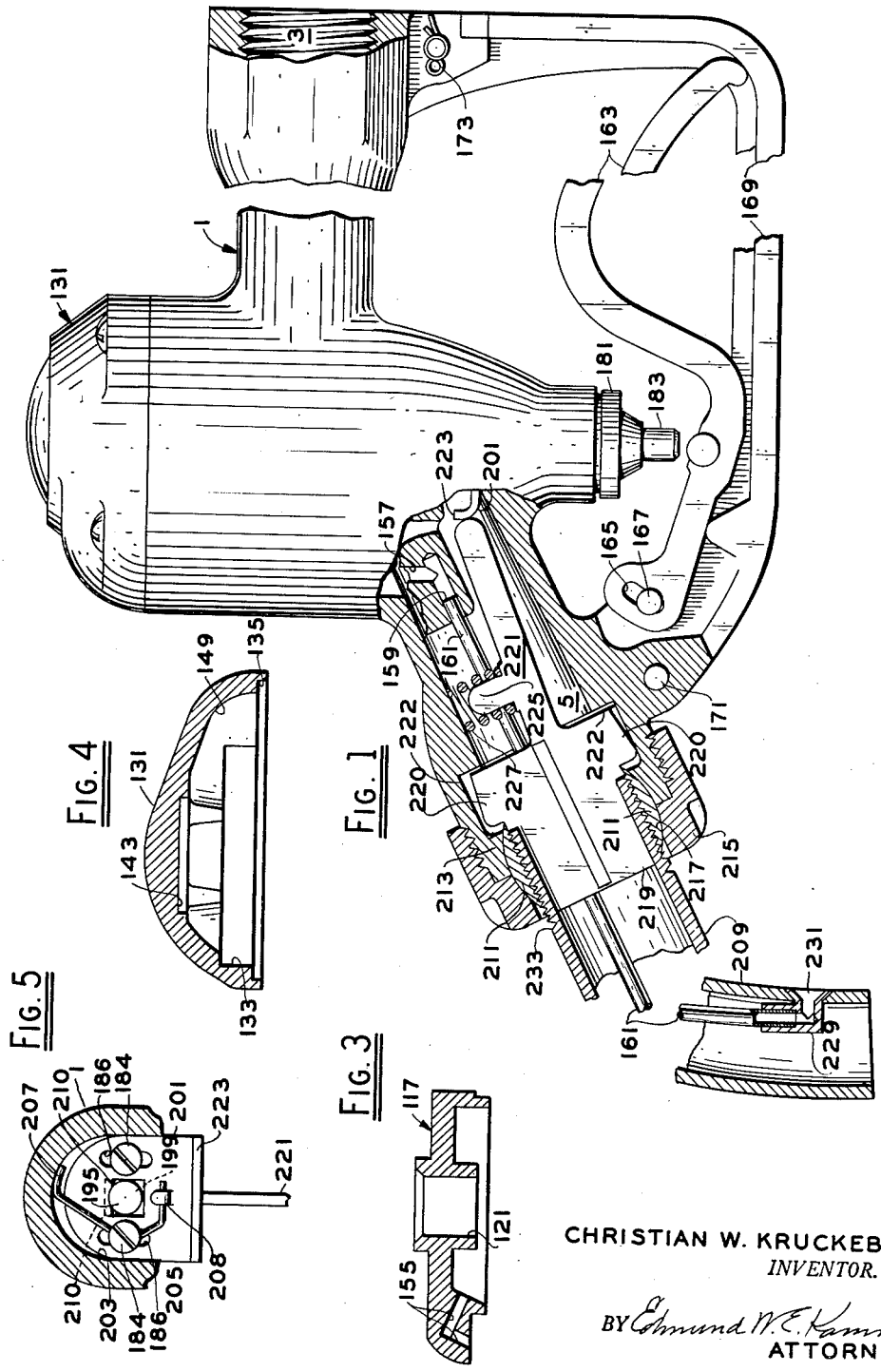
CHRISTIAN W. KRUCKEBERG
INVENTOR.
BY Edmund W. E. Kamm
ATTORNEY

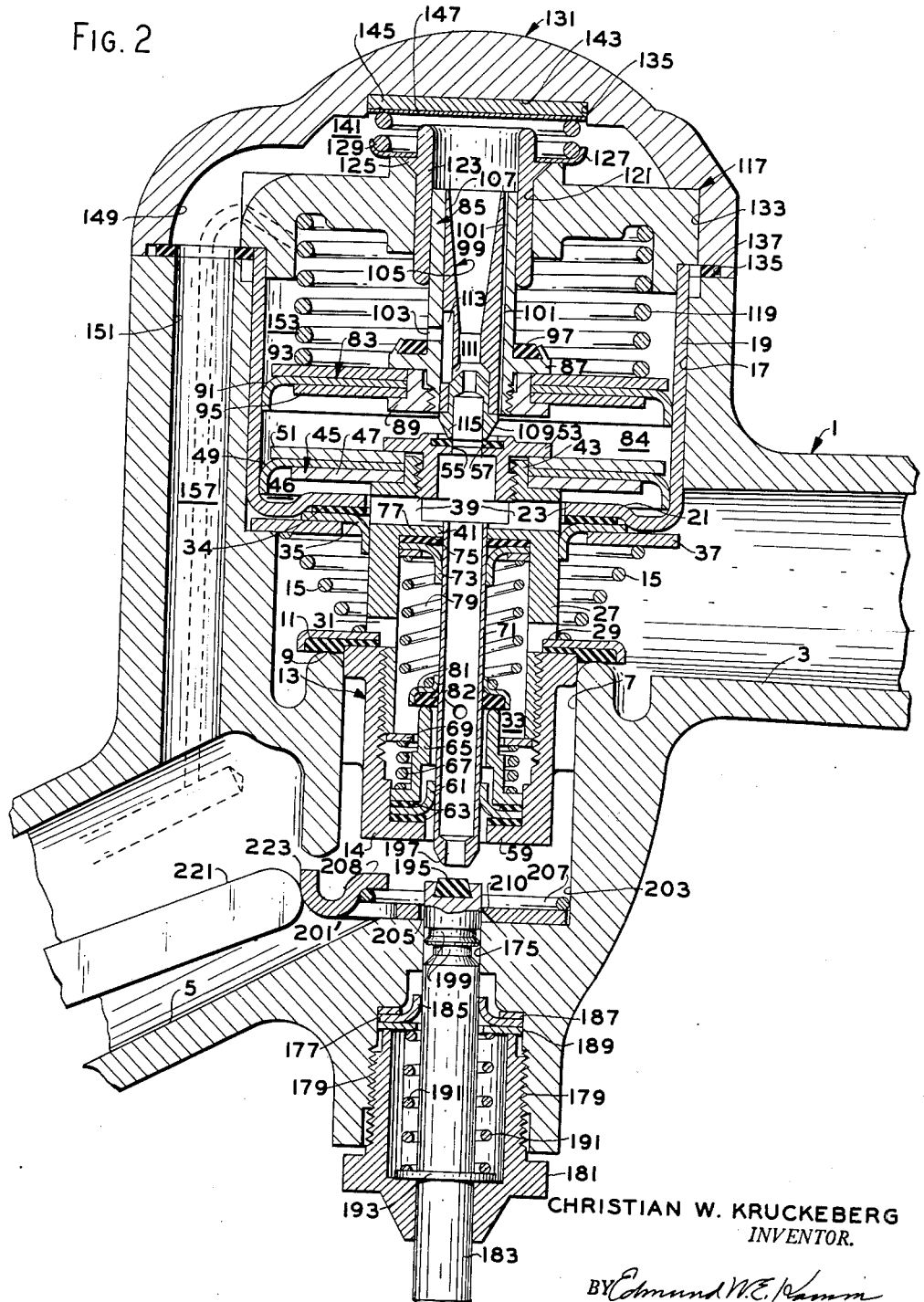

3,042,083
AUTOMATIC NOZZLE
Christian W. Kruckeberg, Fort Wayne, Ind., assignor to Tokheim Corporation, Fort Wayne, Ind., a corporation of Indiana
Filed Oct. 30, 1959, Ser. No. 849,917
19 Claims. (Cl. 141—208)

This invention relates to an automatic nozzle which is used to control the discharge of motor fuel from the hose of the usual filling station dispenser.

An object of the invention is to provide means to hold said nozzle open so long as the nozzle remains inserted in the fill opening of the receiving tank and to cause the nozzle valve to close either when the liquid level in the tank reaches a predetermined maximum or when the nozzle is withdrawn from the tank—either accidentally or otherwise.

Another object of the invention is to provide power means, which are manually controlled, for opening the main nozzle valve so as to render the main valve easy to open, close and to throttle to any desired degree.

A further object of the invention is to provide a power mechanism which is constructed in such manner and of such materials as will minimize wear of moving parts and minimize the deterioration of the sealing elements by the fuel being dispensed.

Yet another object is to provide an automatic nozzle which will be capable of automatic shut-off at small flow rates such as one-half gallon a minute.

These and other objects will become apparent from a study of this specification and the drawings which are attached hereto, made a part hereof and in which:

FIGURE 1 is an elevation of the nozzle with parts in section

FIGURE 2 is an enlarged sectional elevation of the valve and valve operating mechanism FIGURE 3 is a vertical sectional view of the cylinder head FIGURE 4 is a vertical sectional view of the body cap FIGURE 5 is a plan view of the valve latching mechanism.

Referring first to FIGURE 1, the numeral 1 indicates generally the nozzle body having an inlet passage 3, an outlet passage 5 connected by a main valve port 7 which is defined by the valve seat 9. A main valve 11 is mounted on a piston rod 13 which has a guide 14 which rides in the port 7 and the valve is urged towards seat 9 by a spring 15.

The body 1 is provided with a bore 17 which is coaxial with the port 7 and receives a cylinder 19 which is open at its upper end and has an inturned bottom flange 21 which is perforated at 23 (FIGURE 2).

The guide 14 is internally threaded at its upper end to receive the lower end of a piston rod part 27 which is provided with an intermediate shoulder 29. The main valve 11 is held clamped against the guide by the shoulder 29, as the piston rod part is screwed home in the valve guide. The piston rod part is provided with ports 31 above the level of the main valve which allows fuel to flow from the inlet chamber 3 to the hollow interior of the piston rod which serves as a pilot valve chamber 33.

The upper end of the piston rod extends through the opening 23 in the cylinder and is sealed by means of a gasket 34 and a seal member 35 which are clamped between the bottom flange 21 of the cylinder and a washer 37 which rests on the bottom of the bore 17 in the body 3. This washer also serves as a seat for spring 15. The piston rod is provided with a transverse bore 39 which opens at each end into the chamber 46 defined by piston 45 and the side and bottom walls of the cylinder 19. The upper end of the piston rod is provided with an axially extending, internally threaded hollow boss 43 on which is assembled a piston indicated generally by 45 which comprises a support disc 47, a seal member 49 having a downturned rim and a guide disc 51. These parts are held in place on the piston rod by a screw plug 53 which is screwed into the boss 43. The plug is hollow, communicates with the bore 39 and defines a discharge port 55 which is surrounded by a valve seat 57.

It will thus be seen that the valve seat 57, the piston assembly 45, the piston rod 13 and the main valve 11 are movable as a unit up and down with respect to the fixed cylinder and the main valve seat.

Referring further to FIGURE 2, it will be seen that the lower end of the valve guide 14 is provided with an inturned flange 59 and that an upwardly directed seal member 61 is mounted between suitable gaskets 63, one of which rests on the flange 59 and the other is compressed by a pilot valve seat member 65. The latter is urged toward the gaskets and seal by means of a spring 67 which is held in place by a washer 69 which bears on the lower end of the piston rod part 27. A tube 71 is slidably mounted in the seal 61 and is guided at its upper end in an opening 41 in the piston rod part. A down turned seal member 73 is confined against the upper end wall 77 of chamber 33 between a gasket 75 and a pressure ring which is urged toward the wall 77 by a spring 79. This seal member 73 acts on tube 71 to prevent escape of liquid from chamber 33 to the bore 39 through the opening 41. A pilot valve 81 is fixedly mounted on the tube in a position to cooperate with the pilot valve seat 65 and the lower end of spring 79 bears on the pilot valve so as to urge it to close on said seat. The tube 71 is provided with a port 82 below the level of the valve 81 and on the downstream side of the valve, so that liquid may flow from chamber 33 to the interior of the tube through port 82 only when the pilot valve 81 is off its seat 65.

Thus a control passage is defined by ports 31, chamber 33, pilot valve 65, 81, port 82, the interior of tube 71, cross bore 39 and port 55 which receives liquid under pressure from the inlet passage 3 and passes into the first chamber 46 and to the inlet of an inductor or to a second cylinder chamber which will now be described.

A second piston indicated generally by numeral 83 is mounted in the cylinder 19 above the piston 45 to form a chamber 84 therebetween. This piston comprises a hollow rod 85, provided with a radial outwardly extending flange 87 which is spaced somewhat from the lower end of the rod. The lower end of the rod is threaded to receive a nut 89 which serves to clamp the piston seal member 91 between a guide plate 93 disposed adjacent flange 87 and a follower 95 which is acted on by the nut. These parts are aligned by the nut. The seal member of the piston is cupped downwardly. A valve seat 97 is fixed to the flange 87 on the side opposite from the guide 93. The central bore 99 of the rod 85 is of uniform diameter and is provided with an axial vent groove 101 along one side for its entire length. The rod is also provided with a radial port 103 immediately above the valve seat 97. An eductor indicated generally by 105 comprises a discharge nozzle 107 which is counterbored at its lower end to receive a jet tube 109. The discharge end of the jet tube is spaced from the inlet of the nozzle to provide a vacuum inlet 111 which communicates through an axial groove 113 with the port 103. The lower end of the jet tube is formed as an annular valve 115, which encircles the liquid inlet of the eductor and which is adapted to seal against the seat 57 provided on the plug 53 of the lower piston 45. This valve 115, 57 is in effect a trip valve as will be explained below.

A cylinder head 117 shown in FIGURES 1 and 3 is fitted in the upper end of the cylinder and serves as a seat for one end of the spring 119 which bears on piston 83 so as to urge it toward piston 45. The head is provided with a central bore 121 which is coaxial with the rods 13 and 85. A sleeve 123 is slidable in the bore 121 and slidably receives the rod 85.

The bore 121 and the exterior of sleeve 123 have a relatively long bearing area in continuous contact. This minimizes the leakage of fluid between these parts. The same is true of the contact between the interior of the sleeve and the rod 85. The sleeve 123 has a radial flange 125 which serves as a stop with head 117 to limit downward motion of the sleeve and which also supports a spring seat 127 for one end of the spring 129.

It is preferred to form the flange 125 with a downwardly converging taper which seats on a mating taper at the mouth of the bore 121 to serve as a valve which will prevent leakage of fluid into chamber 153 which might interfere with the operation of piston 83. A body cap indicated generally by 131 is provided with a counterbore 133 which receives and encircles the cylinder head 117. It is also provided with a recess 135 which receives a gasket 137 which is compressed between the cap and the body 1 of the nozzle to seal the joint. The cap is held in place by suitable screws which pass through the cap and are screwed into the body. The cap defines a chamber 141 which is above the cylinder head which houses the spring seat 127, spring 129 and the upper end of sleeve 123. The body cap also defines a recess 143 which is disposed immediately above the sleeve 123 and a valve seat of yieldable material 145 is mounted in this recess and is held thereby by a washer 147 which serves as the seat for the upper end of the spring 129. Referring to FIGURE 1, it will be seen as piston 83 rises it will separate the annular trip valve 115 from the seat 57 on the lower piston. It will raise the seat 97 toward the lower end of the sleeve 123 which serves as a valve member to seal off the eductor vacuum inlet port 103. Further lifting of the piston 83 will cause the upper end of sleeve 123, which is a valve unit, to rise against the action of spring 129 until it seals against the seat 145 to seal off the liquid discharge from the eductor and any liquid flow which might occur through the vent groove 101 in the hollow rod 85. It will be seen from FIGURES 1 and 4 that the chamber 141 in the body cap communicates at one side through a passage 149 in the cap and a passage 151 in the body with the outlet chamber 5 of the nozzle. Referring to FIGURES 1 and 3, it will be seen that the vacuum chamber 153, between the cylinder head and the upper piston 83, communicates through channels 155 in the cylinder cap with bores 157 and 159 in the nozzle body. The end of the bore 159 which extends substantially parallel to the outlet passage 5, receives one end of a tube 161 which will be referred to more fully below. The tube 161, and bores 159, 157 and 155 constitute in effect a sensing tube for a purpose to be described.

For the purpose of operating the pilot valve there is provided a trigger 163 which is provided at one end with elongated slot 165 to receive a fulcrum pin 167 mounted on a nozzle guard 169. The guard is fastened to the nozzle body adjacent the outlet end thereof by means of a pin 171 and is fastened to the body adjacent the inlet end thereof by means of a pin 173. The body is provided with a bore 175 which is coaxial with the main port 7 and with the tube 71. This bore 175 is provided with a counterbore 177 and with a further counterbore 179 which is internally threaded to receive a plug nut 181. A plunger 183 is guided by the plug nut and the bore 175, has one end extending outwardly beyond the nut into a position to be contacted by the trigger 163. A seal member 185 is disposed to surround the plunger 183 and is mounted in the counterbore 177, between a gasket 187 and a spring seat 189. One end of a helical spring 191 rests upon the spring seat and the other rests upon a radial flange 193 formed on the plunger 183, to urge the plunger toward the trigger 163. The nut 181 serves as a stop for the flange 193, to limit the outward movement of the plunger 183. The upper end of the plunger is provided with a resilient seat 195 which is adapted to engage the lower end of the pilot valve tube 71. The tube is formed at its lower end as an annular valve 197 which, with seat 195, serves as a relief valve. This valve, with the lower portion of tube 71, provides a relief conduit connecting the control passage with the outlet passage of the body. The portion of the plunger 183 which is disposed normally within bore 175, is provided with two or more peripheral grooves 199. A latch plate 201 is slidably mounted on the floor of a recess 203 in the body 1, located between the plunger 183 and the tube 71 and is movable transversely of the plunger on screws 184 which pass through slots 186 in the plate and screw into the body. This plate is provided with a liquid discharge hole 205 through which the plunger 183 is free to pass when the latch plate occupies its right hand position shown in FIGURE 1.

A spring 207 bears at one end on body 1 and at the other end on a tab 208 of the latch plate and urges it leftward (FIGURE 1). When the latch plate occupies such leftward position, its right hand edge 210 will engage in one or the other of the grooves 199 to latch the plunger against return to its lowermost position.

The means for moving the latch plate from its latched position comprises the nozzle spout 209 which is provided at its inlet and with a spherical journal 211. This journal rests upon a spherical bearing 213 formed in the discharge end of the nozzle body and is held in place by a nut 215 which is provided with a spherical bearing 217 to engage the other portion of the journal. The nozzle spout may thus pivot with respect to the nozzle body about a center defined by the spherical journal and bearings. A spider 219 is inserted in the inlet end of said spout, is fixed thereto and has an arm 221 which extends toward the latch plate and terminates adjacent the bent up end 223 thereof. This arm has a lateral projection 225 upon which is mounted a helical spring 227 which bears on the wall of the chamber 5 and serves normally to hold the spout in its clockwise pivotal position relative to the nozzle body and to hold the lever 221 in engagement with the ear 223 of the latch plate so that the latter will be held in its right hand position with its edge 210 out of engagement with the plunger 183.

Under such conditions, the trigger 123 may be operated to raise and lower plunger 183, which will in turn raise and lower the pilot valve tube 71 without interference by the latch. However, should the nozzle be inserted in the fill opening of a tank and frictionally held therein in the usual manner, the weight of the nozzle body and hose, when the operator lets go of them, will cause the body to pivot clockwise relative to the spout which in effect causes the ear 223 of the latch plate to move downwardly relative to the end of lever 221. When the path of the latch plate is thus cleared, spring 207 will move the edge 210 of the latch into engagement with the plunger 183 so that as the plunger is raised by operation of trigger 163 and upon alignment of one of the grooves 199 with the edge 210 of the latch plate, the latch plate will assume its leftward position relative to the plunger and cause the edge 210 to engage the aligned groove 199 to hold the plunger in its elevated position. When this occurs the plunger will be held irrespective of the position of the trigger 163 which can therefore be released. The flange between the grooves 199 is preferably bevelled on its upper side so that the plunger can be raised even though the latch is engaged in the upper groove.

The spider 219 is provided with two diametrically opposed keys 220 which are disposed in a substantially vertical plane through the longitudinal axis of the nozzle and which are received in keyways 222 in the body. This keying means limits the relative movement of the spout and body to a pivotal motion which is confined substantially to said plane. The contact between the exposed edges of the keys and the corresponding walls of the slots limits the pivotal motion.

The tube 161, previously referred to, extends interiorly of the nozzle past the spider 219 and terminates in an elbow 229 which is fixed to the tip of the nozzle and has an entrance port or inlet 231 at the side of the spout, spaced slightly from the discharge end thereof. The spout is also preferably provided with a V-groove 233 closely adjacent the nut 215 which holds the spout in place. This groove provides a weakened section in the spout which will cause the spout to fracture at the groove in the event that a vehicle should be driven away from the dispenser while the nozzle is still inserted in the fill pipe. Since the tube 161 has a sliding fit in the body, both the spout and tube will be carried away in such a case, and the arm 221 would be rotated by spring 227 to release the latch and would stop the flow of liquid as will be described below.

*Operation*

The nozzle may be operated in several ways which will now be described. In performing the usual events necessary to completely fill a tank, the operator will first install the nozzle spout in the tank fill opening so that the nozzle will remain in place when his hand is removed from the nozzle. The trigger 163 may be adjusted to secure the desired flow of fuel before or after the spout has been installed in the fill opening. However, the trigger must be held in the actuated position until the weight of the nozzle and hose has been applied to pivot the body relative to the spout so as to render the latch plate 201 effective to hold the plunger 183. Otherwise the valve mechanism will close upon release of the trigger.

It will be seen from FIGURES 1 and 2 that raising the plunger 183 will cause the valve seat 195 to engage the relief valve 197 on the tube 71 so that the lower end of this tube is closed. When such contact has been established between the tube and plunger, further upward motion of the plunger will lift the pilot valve 81 from its seat 65.

This will permit flow of liquid under pressure through the control passage, from the inlet passage 3, through the ports 31 in the piston rod 13, into chamber 33 and from this chamber through the pilot valve, port 82, tube 71 and laterally through the bore 39 into the chamber 46 and also through port 55.

Since the parts occupy the position shown in FIGURE 1 when the nozzle is idle, the valve 115 rests on seat 57. Accordingly it will be seen that the flow through the port 55, will not be to chamber 84 but will be to the eductor liquid inlet, the jet tube 109 and nozzle 107 of the eductor, and, since the flange 125 of sleeve 123 will be resting on head 117, the second valve 123, 145 will be open and the flow from the eductor will pass through the chamber 141 and passage 149 of the body cap, passage 151 of the nozzle body to the discharge passage 5 of the nozzle and will flow out the spout to the tank. The flow through the eductor is of course restricted by the size of the jet tube so that a positive pressure will start to build up in the chamber 46 as soon as a full flow of liquid is established through the eductor. Such a flow is sufficient to energize the eductor, that is to cause it to create a flow through the vacuum inlet 111. The vacuum in the vacuum space 111 is transmitted through groove 113 and port 103 to the chamber 153 above piston 83. This vacuum is substantially satisfied by the flow of gas to the chamber 153 through the passages 155, 157, 159, tube 161, elbow 229 and inlet port 231. Accordingly the pressures in chambers 153 and 46 are such that the pistons 45 and 83 will tend to rise together and they do rise when the pressure in chamber 46 is sufficient to overcome the force of the springs 119 and 15 as well as the liquid pressure on the main valve 11. This motion is transmitted by the piston rod 13 to the main valve 11 so that the main valve will open. It will be seen that the tube 71 and pilot valve will usually be stationary and will occupy the position to which they have been preset by trigger 163. Accordingly, as the main valve opens it will be seen that the pilot valve seat 65 will move toward the pilot valve 81 and will tend to throttle the pilot valve opening.

Since the chamber 46 is directly connected with the outlet passage 5 through the eductor, a predetermined flow must be constantly supplied through the pilot valve to maintain the piston 45 in a valve open position. Since this flow, which is regulated by the pilot valve, is reduced as the main valve opens, an equilibrium position of the main valve will be attained when the inflow through the pilot valve balances the outflow through the eductor. The amount by which the main valve will open is thus established by the initial opening of the pilot valve, that is, if the pilot valve is opened until the uppermost groove 199 is engaged by the latch 201, the pilot valve opening will be relatively small and the main valve opening will be correspondingly small. Whereas if the pilot valve is opened to the point that the second groove 199 is engaged by the latch, both the pilot valve and the main valve openings will be relatively large. It should be here noted that the initial flow through the eductor, before the main valve opens, can attain flow rates which are sufficient to top off at tank or to fill small containers, so that the main valve need not be opened unless a larger flow is desired. As will be shown below, the automatic shutoff mechanism of the nozzle will operate to stop the slow flow through the nozzle as well as the main flow, provided the slow flow is sufficient to energize the eductor. Further, the maximum rate of the slow flow attainable before the main valve opens depends upon a number of factors such as the strength of springs 119 and 15, the effective area of the piston 45, the unbalanced area of the main valve, the size of the bore in the jet tube, etc., so that these factors can be selected to produce the performance desired.

The parts will remain in the positions corresponding to the pilot valve setting until the rising liquid level in the tank covers the inlet port 231. When this occurs, the resistance to flow of liquid into and through the small bore sensing tube will cause the vacuum in the chamber 153 to increase in magnitude. The piston 83 will be moved upwardly by this vacuum relative to the piston 45 so as to lift the valve 115 surrounding the eductor jet from the seat 57 to admit pressure liquid into the chamber 84 between the two pistons from the pilot valve tube 71 through port 55. The initial movement of piston 83 is made possible by the vent 101 which admits fluid to the chamber 84 prior to the opening of the trip valve. The pressures in chambers 84 and 46 being thus substantially balanced, the piston 45 and the main valve 11 will now be moved downwardly to the closed position by spring 15. However, the pilot valve seat 65 will move away from the pilot valve so that flow through the control passage into chamber 84 will continue and will actually increase as will the flow through the eductor, chamber 141, passages 149, 151 to the outlet chamber 5 and spout. The pressure in chamber 84 will thus rise quickly and will raise piston 83 upwardly against the action of the spring 119 to first close the bottom end of sleeve 123 on seat 97 whereupon the piston will raise the sleeve 123 to force the upper end thereof against the seat 145 in the body cap to close off all flow through the eductor and thereby the remaining flow through the nozzle. Since the pilot valve 81 remains open, the pressure in chamber 84 maintains all the parts in the last described position.

To reestablish flow to the nozzle in order to completely fill the tank, it is necessary for the operator to withdraw the nozzle spout 201 from the fill pipe. When this has been done, the weight of the nozzle body and hose is removed from the spout so that the spring 227 acting on lever 221 will pivot the spout to its normal position and will also move the end of lever 221 to engage and move the latch plate 201 to its initial position (FIGURE 1). The edge of the hole 205 in the latch plate is thus removed from engagement in the groove defining portion of the plunger 183 so that the plunger will be return to its normal position by spring 191, thereby relieving pressure on the tube 71 which permits the pilot valve 81 to close on seat 65 on the action of its spring 79. At the same time the relief valve 197 on the tube 71 separates from its seat 195 on the plunger so that liquid may pass from chamber 84 back through port 55 in the threaded plug 53 of the first piston, through the interior of the tube 71 to the discharge chamber 5 of the nozzle. The release of pressure in chamber 84 as described permits spring 119 to restore the piston 83 to its initial position closing the trip valve 115—57. The vacuum condition in chamber 153 is of course relieved through the sensing tube and its associated channels as soon as the bottom end of the sleeve 123 seals on its seat 97.

With the above described restoration of piston 83 to its normal position, the valve 123—145 is reopened and when it is fully opened, the seat 97 will move away from the end of the sleeve 123 to reopen the lower valve of the structure. Thus all of the parts are returned to their initial position.

To continue the delivery, the operator will hold the nozzle with the tip of the spot at about the level to which he desires to fill the tank. He will then manually adjust the trigger to obtain the desired flow which will usually be at a relatively small rate, such as one half to one gallon per minute. It is necessary for him to hold the trigger 163 in the desired position while the remainder of the delivery is made. The operation of the trigger 163 as described, will again seal the relief valve 197—195 and will raise the pilot valve 81. It is generally preferable to raise the pilot valve only sufficiently to supply a flow which will energize the eductor without creating sufficient pressure in chamber 46 to lift the main valve. However, should a larger flow be desired, the trigger 163 may be operated at a position in which a sufficient flow is admitted to the eductor to generate the pressure in chamber 46 in order to open the valve 11 to a desired degree.

In either case the automatic stoppage of flow from the nozzle will result as soon as the liquid level rises sufficiently to again close the inlet port 231 of the sensing tube. In the first case in which the main valve was not opened, such immersion of port 231 will again create a vacuum in chamber 153 which will move the piston 83 upwardly to open trip valve 115—57. This will again admit pressure to the chamber 84 between pistons 83 and 45 which will result in upward movement of the piston 83, closure of the valve 123—97 and shortly thereafter the valve 123—145 to stop all flow. In the second case in which the main valve was partially open, the same closing cycle which was initially described will be followed to stop the flow.

In either case, the parts will again be restored to their initial positions by release of the trigger 163.

It will thus be seen that such automatic control of either the full flow through the nozzle, partial flow through the main valve and the pilot valve, or flow through the pilot valve and eductor only is afforded by the described structure so long as the flow through the eductor is sufficient to energize it.

It is obvious that various changes may be made in the form, structure and arrangement of parts of the specific embodiments of the invention disclosed herein for purposes of illustration, without departing from the spirit of the invention. Accordingly applicant does not desire to be limited to such specific embodiments but desires protection falling fairly within the scope of the appended claims.

I claim:

1. An automatic nozzle comprising a body defining a liquid inlet passage, an outlet passage, a spout communicating therewith and a port connecting said passages, a first, double acting fluid motor comprising first and second chambers, a main valve connected for operation by said first motor to open said port when said first chamber is pressurized and for closing said main valve when said second chamber is pressurized, a second, double acting fluid motor, comprising third and fourth chambers, an eductor having a liquid inlet, a vacuum inlet and an outlet, a vent connecting said eductor outlet with said third chamber, a control passage for conducting liquid from said inlet passage to said first chamber and said eductor liquid inlet, to energize said eductor, a normally closed pilot valve for said control passage, manual means for variably opening said pilot valve to energize said eductor and to variably pressurize said first chamber, means for preventing opening of said main valve until the pressure in said first chamber exceeds that required to energize said eductor, means including a normally closed trip valve for supplying liquid from said control passage to said second and third chambers, a liquid level sensing tube having its outlet communicating with said fourth chamber and having its inlet adjacent the spout outlet, channel means, including a normally open first valve, for connecting said fourth chamber to the eductor vacuum inlet so that, upon closure of said sensing tube, said eductor will evacuate said fourth chamber to start said second fluid motor, means responsive to the starting of said second motor for opening said trip valve to pressurize said second and third chambers, for closing said main valve if it is open, and maintain the operation of said second motor, means, including a second normally open valve, for connecting the eductor outlet with said spout, means operable by said second motor, during the maintained operation thereof, for closing said first and second valves.

2. The structure defined by claim 1 which includes a pressure relief conduit having an inlet connected with said control passage downstream of said pilot valve and an outlet communicating with said outlet passage, a normally open relief valve for said conduit and means operable by said manual means, for closing said relief valve prior to the opening of said pilot valve.

3. The structure defined by claim 1 which includes releasable latching means for holding said pilot valve open, means to mount said spout on said body for movement between initial and actuated positions, yieldable means for urging said spout toward its initial position and means operable by said spout upon movement thereof toward its initial position for releasing said latching means.

4. The structure defined by claim 1 which includes releasable latching means for holding said relief valve closed, means to mount said spout on said body for movement between initial and actuated positions, yieldable means for urging said spout toward its initial position and means operable by said spout upon movement thereof toward its initial position for releasing said latching means.

5. The structure defined by claim 1 which includes a pressure relief conduit having an inlet connected with said control passage downstream of said pilot valve and an outlet communicating with said outlet passage, a normally open relief valve for said conduit, said manual means including an element movable to a position to close said relief valve and to open said pilot valve, releasable latching means for holding said element in said position, means to mount said spout on said body for movement between initial and actuated positions, yieldable means for urging said spout toward its initial position and means operable by said spout upon movement thereof toward its initial position for releasing said latching means.

6. The structure defined by claim 5 which includes yieldable means for urging said element in a direction to open said relief valve and close said pilot valve.

7. A nozzle comprising a body defining a liquid inlet passage, an outlet passage and a port connecting said passages, a valve mounted for movement relative to said port for controlling the flow therethrough, manually controlled means for selectively moving said valve to any of a number of positions, releasable latching means for holding said valve in any selected one of said positions, a liquid discharge spout, means for sealingly mounting one end of said spout on said body in said discharge passage and for pivotal movement, relative to said body, between initial and actuated positions, yieldable means for urging the spout toward said initial position and means disposed in said discharge passage and operable by said spout upon movement thereof toward its initial position for releasing said latching means.

8. The structure defined by claim 7 wherein said spout mounting means comprises a ball and socket joint and means for preventing relative rotation of said spout and body.

9. The structure defined by claim 7 wherein said spout mounting means comprises ball and socket joint and keying means on said spout and body for preventing relative movement of said spout and body on said joint, in all but two substantially opposite directions.

10. The structure defined by claim 9 wherein the keying means of said spout is supported by a spider inserted in said spout.

11. An automatic nozzle comprising a body defining a liquid inlet passage, an outlet passage, a spout communicating therewith and a port connecting said passages, a cylinder in said body, first and second pistons movable in said cylinder, said cylinder and first piston defining a first chamber disposed between said first piston and said port, a main valve connected for operation by said first piston to control said port, said cylinder and pistons defining a second chamber, a head for said cylinder, said head and second piston defining a third chamber, an eductor having a liquid inlet, a vacuum inlet and an outlet, a vent connecting said eductor outlet with said second chamber, a control passage for conductiong liquid from said inlet passage to said first chamber and said eductor liquid inlet, to energize said eductor, a normally closed pilot valve for said control passage, manual means for variably opening said pilot valve to energize said eductor and to variably pressurize said first chamber, means for preventing opening movement of said first piston and main valve except in response to a pressure below that required to energize said eductor, means, including a normally closed trip valve, for supplying liquid from said control passage to said second chamber, a liquid level sensing tube having its outlet communicating with said third chamber and having its inlet adjacent the spout outlet, channel means, including a normally open first valve, for connecting said third chamber to the eductor vacuum inlet so that, upon closure of said sensing tube, said eductor will evacuate said third chamber to move said second piston, means responsive to the movement of said second piston for opening said trip valve to pressurize said second chamber for closing said main valve if it is open, and for moving second piston further, means, including a second normally open valve, for connecting the eductor outlet with said spout, means operable by said second piston, during the further movement thereof, for closing said first and second valves.

12. The structure defined by claim 11 wherein said trip valve comprises a valve member on one piston and a valve seat on the other piston, said valve member and seat being disposed for closing and opening by the relative movements of said pistons toward and away from each other.

13. The structure defined by claim 11 wherein said eductor is mounted on said second piston, for movement therewith and said normally open third valve comprises a valve element and a seat, one of which is on the second piston and the other of which is on the cylinder head, said element and seat being disposed to be closed by said further movement of said second piston.

14. The structure defined by claim 11 which includes a piston rod connecting said main valve and first piston and defining a pilot valve chamber and ports connecting said latter chamber with said inlet passage, a pilot valve seat on said rod and within said latter chamber, said control passage being defined, in part, by a tube slidably mounted on said rod for movement in the same directions as said rod and extending through said pilot valve seat and chamber, said tube defining a port downstream of said pilot valve, and its seat, said port and tube also forming portions of said control passage, said manual means being arranged to move said tube in one direction to open said pilot valve and said piston being arranged to move said main valve and said pilot valve seat in said direction, to open said main valve, and to throttle said pilot valve, so as to stabilize said main valve in an equilibrium position.

15. The structure defined by claim 14, wherein said tube defines a pressure relief conduit connecting said control passage with said outlet passage, a normally open relief valve for said conduit and means operable by said manual means for closing said relief valve prior to the opening of said pilot valve.

16. The structure defined by claim 15 which includes releasable latching means for holding said pilot valve open and said relief valve closed.

17. The structure defined by claim 16 which includes means for mounting said spout for movement to and from an initial position relative to said body, and means operable by said spout for releasing said latching means when said spout is moved to its initial position.

18. The structure defined by claim 11 wherein said second normally open valve comprises a valve unit and a seat, and means operable by said second piston, upon said further movement thereof, for relatively moving said valve unit and seat to stop the flow from said eductor outlet.

19. An automatic nozzle comprising a body defining an inlet passage, an outlet passage and a port connecting said passages, a piston rod reciprocably mounted in said port, a main valve, reciprocable with said rod to control said port, said rod defining an internal pilot valve chamber and an inlet opening connecting said chamber and inlet passage, a tube mounted for reciprocation on said rod and passing through said chamber, said tube defining an inlet thereto from said chamber, a pilot valve including means operable by said tube to control said inlet, yieldable means for urging said main valves closed, manual means for moving said pilot valve, a cylinder in said body, a first piston in said cylinder, connected to said rod and defining therewith a first chamber disposed between said main valve and first piston, said piston connection with said rod, a second piston in said cylinder, having an initial position adjacent said first piston, an actuated position remote therefrom and defining therewith a second chamber, yieldable means for urging said second piston to its initial position, an eductor mounted on said second piston and having a pressure inlet, a vacuum inlet and an outlet, a control passage, including said inlet opening, internal chamber, inlet opening and tube for supplying pressure liquid to said eductor inlet and said first chamber, a trip valve to connect said second chamber with said tube, said valve including means operable by said second piston to close the valve when the piston occupies its initial position and to open the valve when the piston moves toward its actuated position, a cylinder cap defining with said second piston a third chamber, a cover defining with said cap a fourth chamber, a conduit connecting said fourth chamber with said outlet passage, a sleeve mounted in said cap for reciprocation between initial and actuated positions, yieldable means for urging said sleeve toward its initial position, the outlet end of said eductor being slidably received in said sleeve, a vent channel connecting the interior of the sleeve with said second chamber, a seat on said cover, for engagement by said sleeve in its actuated position, to close said eductor outlet, means defining a vacuum conduit connecting said third chamber with said vacuum inlet, seat means on said second piston, disposed for engagement with said sleeve, as said second piston moves toward its actuated position, a sensing tube having its inlet adjacent the end of the spout, and its other end with said third chamber, whereby opening of the pilot valve to a predetermined degree will create a vacuum in the third chamber which is satisfied by gas inducted through said sensing tube, further opening of the pilot valve will admit sufficient pressure to said first chamber to open the main valve, closure of the sensing tube with liquid will produce a vacuum of greater magnitude in the third chamber which moves the second piston to its actuated position, to open the trip valve and close the eductor vacuum inlet and eductor outlet and the opening of the trip valve admits pressure to the second chamber to free the main valve for closure.

References Cited in the file of this patent
UNITED STATES PATENTS

| | | |
|---|---|---|
| 2,110,941 | Payne | Mar. 15, 1938 |
| 2,686,626 | Slattery | Aug. 17, 1954 |
| 2,867,249 | Denlinger | Jan. 6, 1959 |